L. P. BASSET.
PROCESS OF MANUFACTURE OF SODIUM SULFATE.
APPLICATION FILED JUNE 3, 1915.

1,279,499.

Patented Sept. 24, 1918.

L. P. Basset.
Inventor.

By *Croydon Marks*
Attorney.

UNITED STATES PATENT OFFICE.

LUCIEN PAUL BASSET, OF PARIS, FRANCE.

PROCESS OF MANUFACTURE OF SODIUM SULFATE.

1,279,499.  Specification of Letters Patent.  Patented Sept. 24, 1918.

Application filed June 3, 1915. Serial No. 31,970.

*To all whom it may concern:*

Be it known that I, LUCIEN PAUL BASSET, a citizen of the French Republic, residing at 92 Rue de la Victoire, Paris, in the Republic of France, have invented certain new and useful Improvements in the Process of Manufacture of Sodium Sulfate, of which the following is a specification.

This invention has for its object to provide an improved process for the manufacture of sodium sulfate which consists in subjecting sodium chlorid to the direct action of oxidizing and moist sulfurous gases.

It is known that an exothermic reaction is produced at about 500 degrees C. between sodium chlorid sulfurous anhydrid, oxygen and water, which may be represented by the following equation:

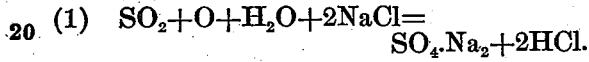

(1) $SO_2 + O + H_2O + 2NaCl = SO_4.Na_2 + 2HCl.$

This reaction which is the basis of the Hargreaves process is extremely interesting because it dispenses with the production of sulfuric acid, and allows of direct use of the gases from pyrites-roasting furnaces for instance.

In the Hargreaves process the reaction takes place between the sulfurous gases and solid sodium chlorid, which is a great drawback, as, on passing the sulfurous gases over solid sodium chlorid, the action of the gas is only superficial, and in any case is very slow. The sodium chlorid becomes covered with a crust of sodium sulfate, which prevents the action of the gases from penetrating into the mass.

In order to render the reaction complete it is necessary to cause the gases to act during several weeks upon the same quantity of salt, thus necessitating a considerable plant, which is very expensive, and naturally requires a corresponding amount of labor.

Now the present invention has for its object to provide an improved process of manufacture of sodium sulfate based on the reaction of the Hargreaves process, but avoiding the above stated drawback, by causing the gases containing oxids of sulfur and oxygen to act, instead of upon the solid salt, upon the vapor of sodium chlorid, or upon a mist of sodium chlorid produced by cooling the vapor. When hereafter in the specification and claims sodium chlorid vapor is referred to, it is to be understood that a mist or suspension of sodium chlorid in a gaseous mixture is covered by the expression "sodium chlorid vapor."

By operating thus, the reaction is rendered very rapid and very complete, and the manufacture can be carried on continuously, which is an additional advantage.

As by-products of the process there is obtained hydrochloric acid or chlorin according as the process is carried out with gases containing oxids of sulfur and oxygen which are in the wet state (that is to say mixed with water vapor), or in the dry state.

The sodium chlorid employed in the state of vapor may be produced by allowing this salt to drop upon or into a furnace. The gases of combustion of this furnace will carry away with them the volatilized sodium chlorid, and generally may be mixed without inconvenience with the gases containing oxids of sulfur and oxygen and products of the reaction. This mixture may however be avoided by volatilizing sodium chlorid in a muffle furnace whereof the muffle is closed and provided with an escape pipe. According to the temperature of the reaction chamber, the salt will remain in the state of vapor, or will condense as a very thin mist, and in both cases the reactions will take place instantly and completely.

The exothermic nature of the reaction will in general be sufficient to maintain the requisite temperature in the reaction chamber, and the sodium sulfate being less volatile than the sodium chlorid will be deposited in said chamber. In certain cases it will be possible to carry out the reaction in the furnace that produces the gases containing oxids of sulfur and oxygen by introducing the sodium chlorid in the form of vapor into the said furnace, or by mixing the solid salt with the substances which give off oxids of sulfur when heated.

The invention also comprises an improved combined process of manufacture of cement and sodium sulfate, which is an application of the process on the above described principle to a cement furnace fed with calcium sulfate, such as the one described in the specification of British Patent No. 17873 of March 4, 1913 of the present inventor, wherein the gases containing oxids of sulfur and oxygen are generated by the said furnace. In such a case the process is simplified very advantageously, because it is possible to produce all the reactions in the actual cement furnace which will therefore produce simultaneously cement and sodium sulfate.

If to the mixture of gypsum and clay to be converted into cement, there be added the requisite quantity of sodium chlorid, this salt will become volatilized in that part of the furnace which is sufficiently hot, and by mixing with the gas containing oxids of sulfur and oxygen produced in the zone of dissociation of the calcium sulfate, will give reaction (1).

The sodium sulfate thus produced will be entirely carried off by the furnace gases and the chlorin or the hydrochloric acid, since the sodium sulfate is itself volatile at about 1200 degrees C., and in any case does not withstand the temperature of 1500 to 1600 degrees which latter obtains at the end of the furnace. Finally, cement will be obtained on the one hand, and sodium sulfate on the other hand which will be condensed in a chamber connected to the furnace.

The accompanying drawings illustrate by way of example installations of apparatus for carrying the improved process into effect.

Figure 1:
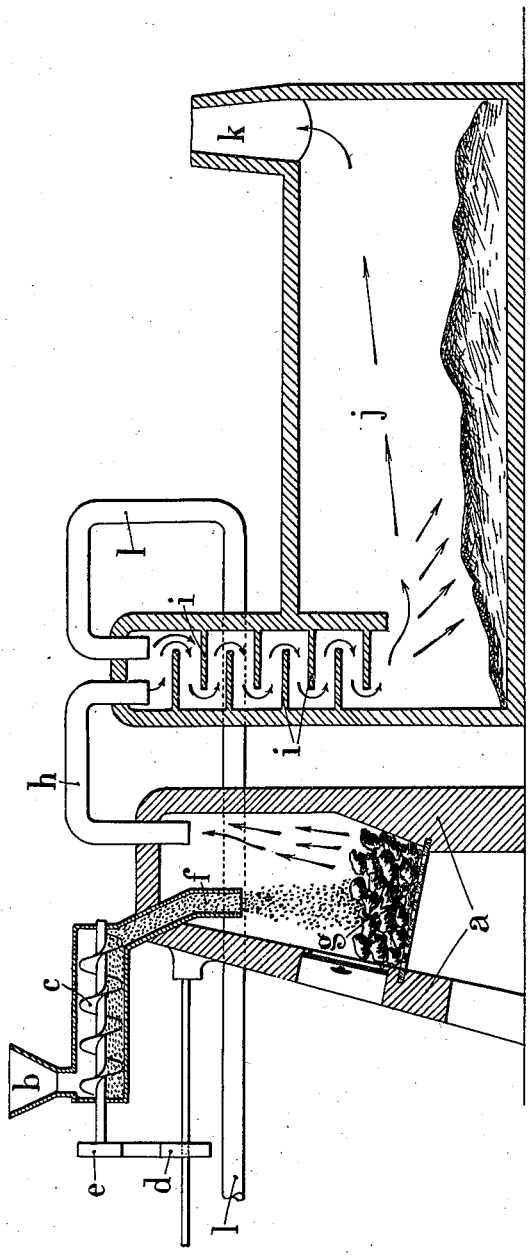
Figure 1 is a general arrangement of the apparatus for utilizing gases of any origin which contain oxids of sulfur and oxygen.

As shown in Fig. 1, $a$ is a furnace for volatilizing the salt. The sodium chlorid charged into a hopper $b$, is conveyed from the top of the furnace by a conveyer screw $c$, for instance, or by any other means of transport; a screw has the advantage of allowing the conveyance of the salt and its introduction into the furnace in a closed chamber. The amount of salt supplied may be regulated at will by varying the speed of the screw by means of gearing $d$ $e$.

The sodium chlorid falls through a trunk $f$ on to the fireplace $g$ where the salt is volatilized and is carried off by the gases of combustion of the furnace. The draft takes place through the pipe $h$ which conveys the salt vapors mixed with the gases of combustion of the furnace, which must be oxidizing or neutral, into a baffle column $i$ connected to a large chamber $j$ wherein the reaction (1) takes place, and wherein also the sodium sulfate may condense. A draft chamber $k$ serves to produce the requisite draft. On entering the baffle column $i$ the volatilized salt meets the gases containing oxids of sulfur and oxygen with or without an admixture of water vapor, which are introduced thereinto by the pipe $l$ leading from the furnace that generates the sulfurous anhydrid. By the action of the baffles of the column $i$ the gases are intimately mixed with the salt vapor, and the reaction takes place instantly and completely. The sodium sulfate deposits upon the floor of the chamber, and the chlorin or the hydrochloric acid is collected behind the chamber $j$, in columns or in chambers over water or over lime, when it is desired to prepare bleaching powder from the chlorin produced. The chamber $j$ must be large enough to render the speed of the gases therein low, and to prevent the sodium sulfate from being carried off by the chimney. Moreover, behind said chamber, any suitable filters or scrubbers may be provided for the purpose of retaining the last traces of sodium sulfate.

The reaction (1) is exothermic as above stated; it gives out sufficient heat to maintain in the chamber $j$ a temperature appreciably higher than that of the gases arriving therein.

If this temperature is about 850 to 900 degrees C., the sodium chlorid vaporized in the furnace will remain in the state of vapor, and the reactions will take place between the vapors and the sulfurous gases. If on the other hand, the temperature is less than 850 degrees, the sodium chlorid will condense in the form of a fine mist, which will be finer the greater the quantity of gas which carries over the salt. At this degree of subdivision, and if the temperature is not less than 500 degrees, the reaction will also take place immediately and completely.

In certain cases it might be an advantage to effect the vaporization of the sodium chlorid in a muffle furnace wherein the muffle is closed and provided with an outlet pipe so as not to allow the salt vapor to mix with the gases of combustion from the fireplace.

From the foregoing it will be perceived that the process is continuous, it being merely necessary to provide two reaction chambers $j$ operating alternately, or any suitable means for discharging the same automatically.

Figure 2:
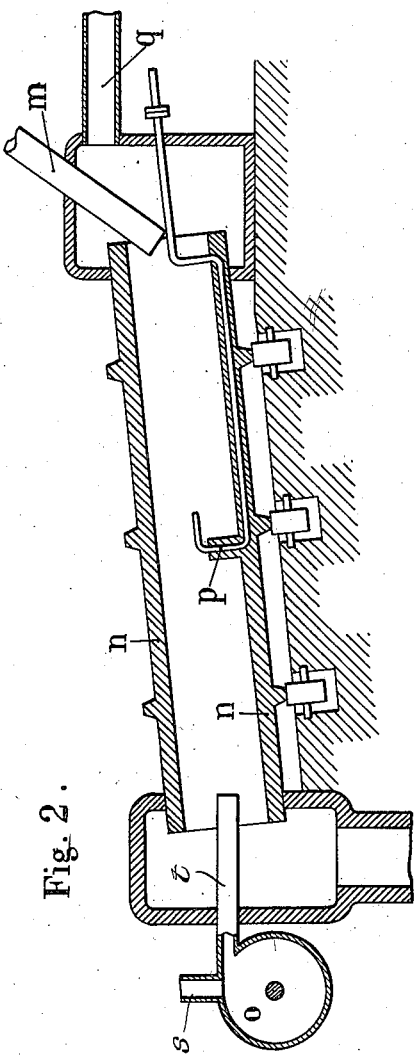
Fig. 2 is a rotary kiln for the combined manufacture of sodium sulfate and cement from gypsum and sodium chlorid.

Fig. 2 shows a revolving furnace constructed for the combined manufacture of cement and sodium sulfate by means of gypsum and sodium chlorid on the principle above stated. An intimate mixture of gypsum, clay and coal receives the calculated quantity of sodium chlorid for saturating the whole of the sulfuric acid of the calcium sulfate. This pastry or dry mixture is introduced into the pipe $m$ at the upper part of the revolving oven $n$ heated by a flame from the burner $t$. This flame may be produced by a blast of air from the fan $o$ and fuel introduced through the pipe $s$. This fuel may be coal dust if so desired. Owing to the inclination of the kiln and its rotation, the mixture travels toward the lower end of the rotary furnace and gets dry, and becomes heated to an increasing degree until it reaches the lower end of the fireplace where it should have a temperature of 1500 to 1600 degrees C., for burning the cement.

Toward the middle of the kiln where the temperature is about 1000 degrees C., the gypsum becomes dissociated into lime and sulfurous anhydrid. This dissociation as is well known, is facilitated by the presence of the clay and also of the calcium sulfid produced by a partial reduction of the sulfate by the coal. Finally lime is produced which with the clay will yield a cement in the burning zone of 1500 to 1600 degrees.

At the temperature of about 900 degrees however, the sodium chlorid becomes volatilized and mixes with the sulfurous anhydrid given off by the calcium sulfate. As it travels through the kiln it meets water vapor which comes from the drying zone as well as from the fire, and the reaction (1) takes place, thus producing hydrochloric acid and sodium sulfate. These products are drawn from the kiln through the pipe $q$, and the sodium sulfate deposits in a chamber connected to the oven.

In order to satisfy the conditions of the reaction it is necessary that the combustion in the furnace should be highly oxidizing. In order to avoid cooling the furnace by a too great excess of air it is sufficient to arrange in the oven a nozzle $p$ opening in the zone of disassociation, through which the quantity of air necessary to the reaction can enter.

From the foregoing it will be seen that it is possible with the improved process to carry on a continuous and combined process of manufacture of cement and sodium sulfate wherein the sulfurous acid generated in the cement oven is utilized in the latter.

This invention gives a considerable saving in apparatus and labor; the cement produced thereby is of the best possible quality because at the burning temperature (1500 to 1600 degs.) neither the sodium chlorid nor the sodium sulfate are fixed, so that there is no risk of these products adulterating the cement.

In reality the operation of such a furnace or oven is more complicated than as above stated; secondary reactions are necessarily produced between the clay, the calcium sulfate, and the sodium chlorid, but those reactions always concur finally in the production of cement and sodium sulfate.

In the course of an operation carried out as above stated, the following reactions for instance will take place.

1. The reaction of the clay upon the salt which takes place toward 550 degrees. The water combined with the clay will be driven off and together with the water present in the state of vapor in the kiln will form hydrochloric acid with the chlorin evolved. A sodium silico-aluminate will also be formed, and this will react forward in the kiln:

a. upon the calcium sulfate, thus producing calcium silico-aluminate and sodium sulfate by double decomposition. This sodium sulfate distils and joins the sodium sulfate produced in the main reaction.

b. for a small part, upon the lime that is formed in the zone of dissociation, so as to produce cement and soda which distils in the hottest part of the oven and is converted into sodium sulfate on meeting sulfurous anhydrid and oxygen is the less hot portion.

2. A reaction of the clay represented in the equation by $SiO_2$, upon the mixture of calcium sulfate and sodium chlorid in the presence of water vapor which may be represented by the equation (2):

(2) 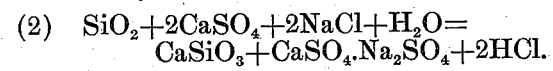
$$SiO_2 + 2CaSO_4 + 2NaCl + H_2O = CaSiO_3 + CaSO_4.Na_2SO_4 + 2HCl.$$

This reaction may be assimilated to the reaction (1), by considering that the action of the silica at a high temperature upon the calcium sulfate liberates sulfurous acid and oxygen. These latter substances on mixing with the water vapor in the oven, then react in their turn upon the sodium chlorid in order to produce sodium sulfate and hydrochloric acid.

The reaction (2) which produces sodium calcium sulfate without necessitating any dissociation of the sulfate, takes place for its part with a very appreciable quantity of the materials. Since it represents an economy of heat it is advisable to facilitate the said reaction and it will be sufficient to force or increase the quantity of water vapor delivered into the oven and particularly to deliver steam or vapor into the middle part of the oven if the fuel which burns at the head of the oven does not supply sufficient water vapor by itself. In reality this reaction gives a double sulfate of calcium and sodium, but this double sulfate will itself become decomposed so as to produce only sodium sulfate under a prolonged action of the water vapor.

In the usual conditions however the calcium sulfate of the double sulfate is decomposed by the calcium sulfid so as to produce lime and sulfurous acid which intervenes in the main reaction, and sodium sulfate which distils off.

Besides, other secondary reactions may take place which are less important, and are special to the conditions under which the main reaction is produced. But as above stated, those reactions generally concur in the formation of sodium sulfate and cement, so that in the end the reaction (1) represents actually the final result.

It is to be understood that the hereinbefore described processes and operations of manufacture are given merely by way of example, and that without departing from the nature of the invention, it is possible to modify according to requirements the general course of manufacture so as to be able to adapt the improved process in each particular case in the best manner to the conditions and industrial means available and existing.

What I claim is:

1. The process of manufacture of sodium sulfate by utilizing the reaction of gases containing oxids of sulfur and oxygen upon sodium chlorid, which consists in converting the sodium chlorid into vapor and causing this vapor to react with the said gases.

2. A process of manufacture of sodium sulfate by utilizing the reaction of gases containing oxids of sulfur and oxygen upon sodium chlorid, which consists in charging sodium chlorid into a furnace wherein it is converted into vapor, and whereby the gases of combustion of said furnace serve as a vehicle for said vapor, and in causing the said gases to react upon the sodium chlorid vapor.

3. A process of manufacture of sodium sulfate by utilizing the reaction of gases containing oxids of sulfur and oxygen upon sodium chlorid, which consists in volatilizing sodium chlorid and producing the reaction of the said gases upon said volatilized sodium chlorid in the furnace that generates the oxids of sulfur.

4. A process of manufacture of sodium sulfate by utilizing the reaction of gases containing oxids of sulfur and oxygen upon chlorid of sodium, which consists in adding solid sodium chlorid in the quantity desired to substances that are capable when heated of giving off oxids of sulfur, and in causing the generated gases to react upon the sodium chlorid vapor that is formed at the same time as said generated gases.

5. A combined process of manufacture of cement and sodium sulfate, which consists in treating in a cement furnace a mixture of gypsum, clay, coal, and sodium chlorid, the latter being in quantity determined for saturating the whole of the sulfuric acid of the calcium sulfate, and effecting the burning operation in a highly oxidizing atmosphere.

In testimony whereof I have signed my name to this specification.

LUCIEN PAUL BASSET.